No. 884,802. PATENTED APR. 14, 1908.
R. J. DICKIE & J. H. BROWN.
STAMP OR TICKET VENDING MACHINE.
APPLICATION FILED FEB. 6, 1907.

5 SHEETS—SHEET 1.

Witnesses
A. Morrill
A. J. Haddan

Inventors
Robert James Dickie
John Henry Brown
by their Attorney
H. H. Haddan

No. 884,802. PATENTED APR. 14, 1908.
R. J. DICKIE & J. H. BROWN.
STAMP OR TICKET VENDING MACHINE.
APPLICATION FILED FEB. 6, 1907.

5 SHEETS—SHEET 2.

No. 884,802. PATENTED APR. 14, 1908.
R. J. DICKIE & J. H. BROWN.
STAMP OR TICKET VENDING MACHINE.
APPLICATION FILED FEB. 6, 1907.

5 SHEETS—SHEET 3.

Witnesses
A. Morrill
A. J. Haddan

Inventors
Robert James Dickie
John Henry Brown
by their Attorney
H. Haddan

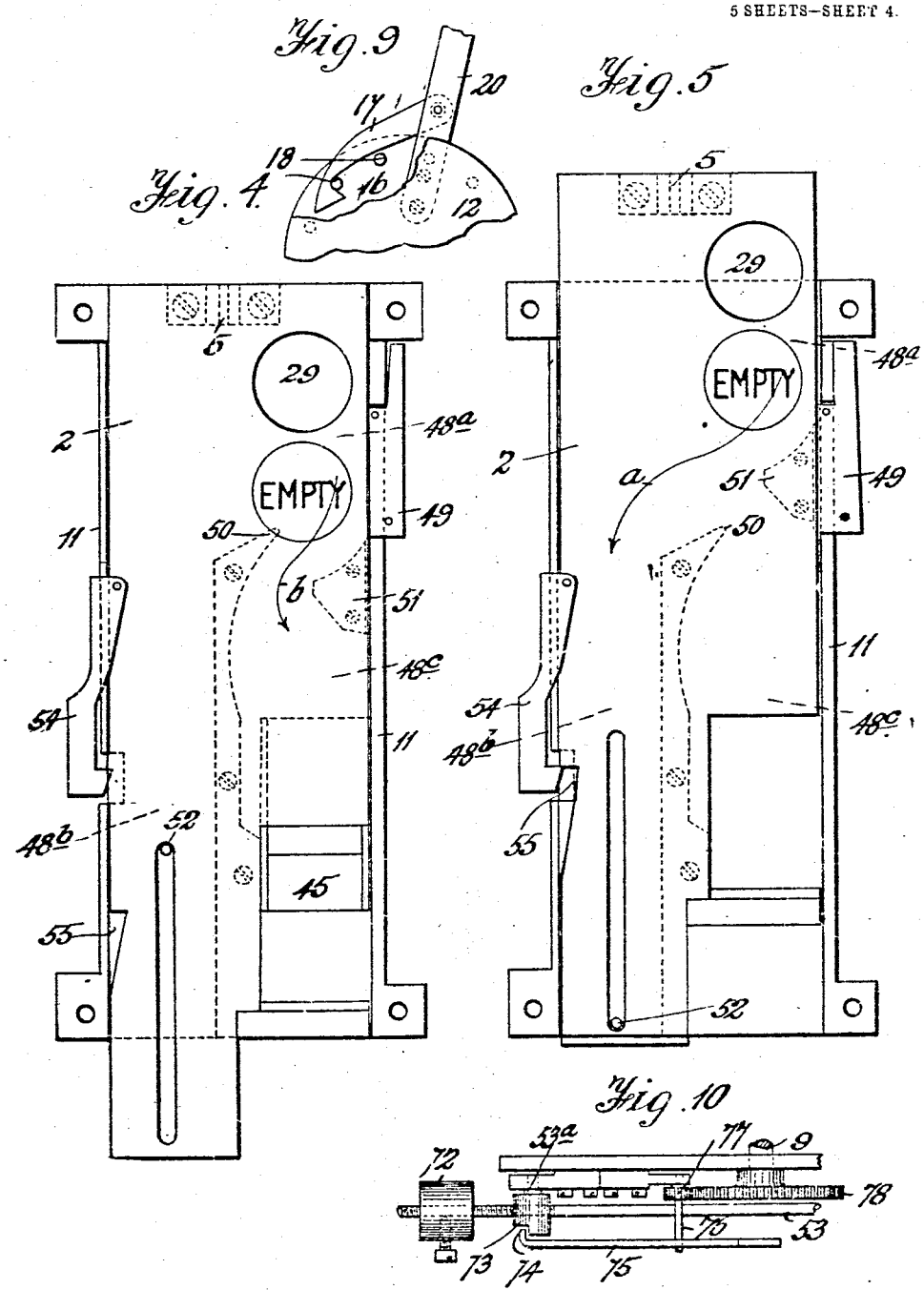

No. 884,802. PATENTED APR. 14, 1908.
R. J. DICKIE & J. H. BROWN.
STAMP OR TICKET VENDING MACHINE.
APPLICATION FILED FEB. 6, 1907.
5 SHEETS—SHEET 5.
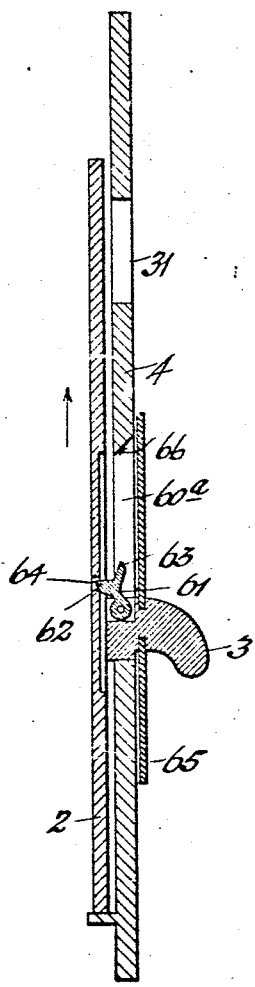
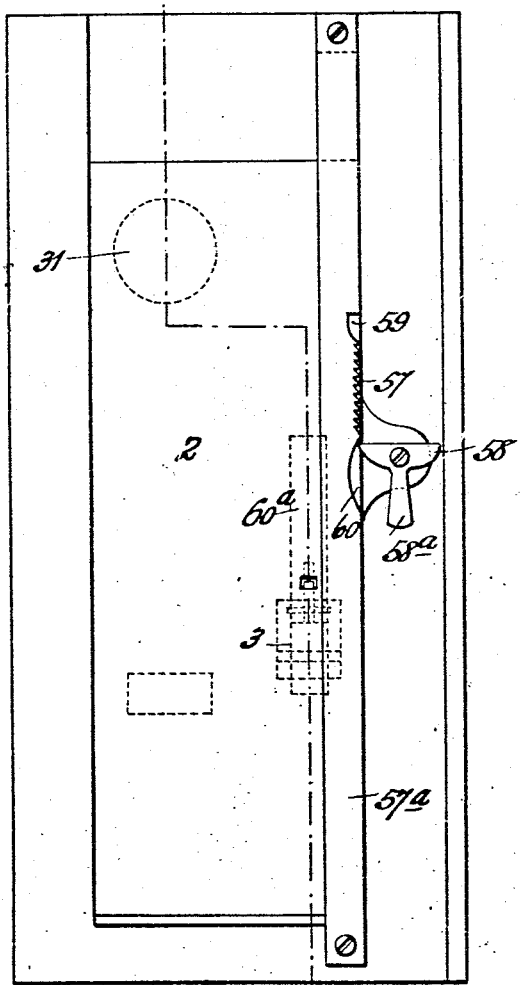
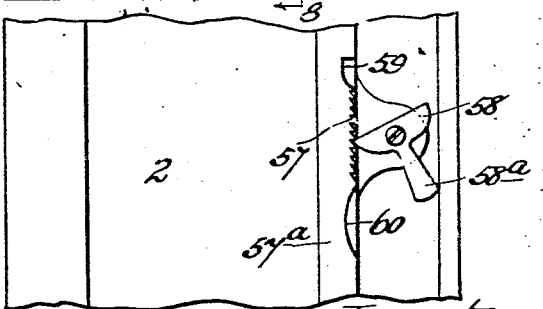
Witnesses
A. Morrill.
A. J. Haldan
Inventors
Robert James Dickie
John Henry Brown
by their Attorney
H. Haldan

UNITED STATES PATENT OFFICE.

ROBERT JAMES DICKIE AND JOHN HENRY BROWN, OF WELLINGTON, NEW ZEALAND, ASSIGNORS, BY MESNE ASSIGNMENTS, TO UNITED STATES AUTOMATIC VENDING COMPANY, OF NEW YORK, N. Y., A CORPORATION OF MAINE.

STAMP OR TICKET VENDING MACHINE.

No. 884,802.   Specification of Letters Patent.   Patented April 14, 1908.

Application filed February 6, 1907. Serial No. 355,113.

*To all whom it may concern:*

Be it known that we, ROBERT JAMES DICKIE and JOHN HENRY BROWN, subjects of the King of England, residing at Wellington, in the Colony of New Zealand, have invented a Stamp or Ticket Vending Machine, of which the following is a specification.

This invention relates to improvements in coin-freed machines for vending postage stamps, tickets and the like, having an intermittently rotated sprocket or pin wheel which feeds a perforated strip of stamps or tickets to an aperture in the inclosing casing where they are delivered to the purchaser.

The improved machine is represented in the accompanying drawings in which

Figure 1:
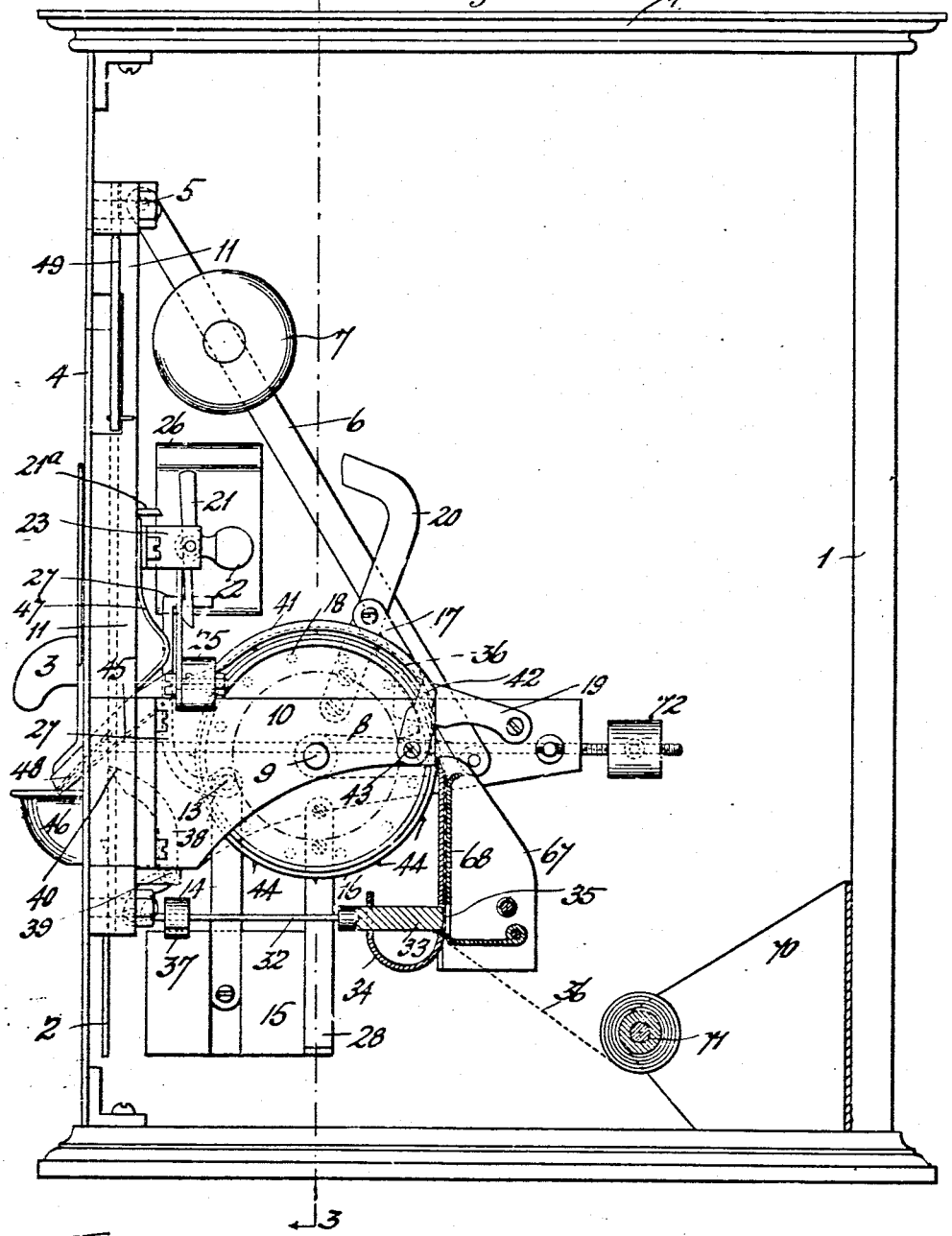
Figure 2:
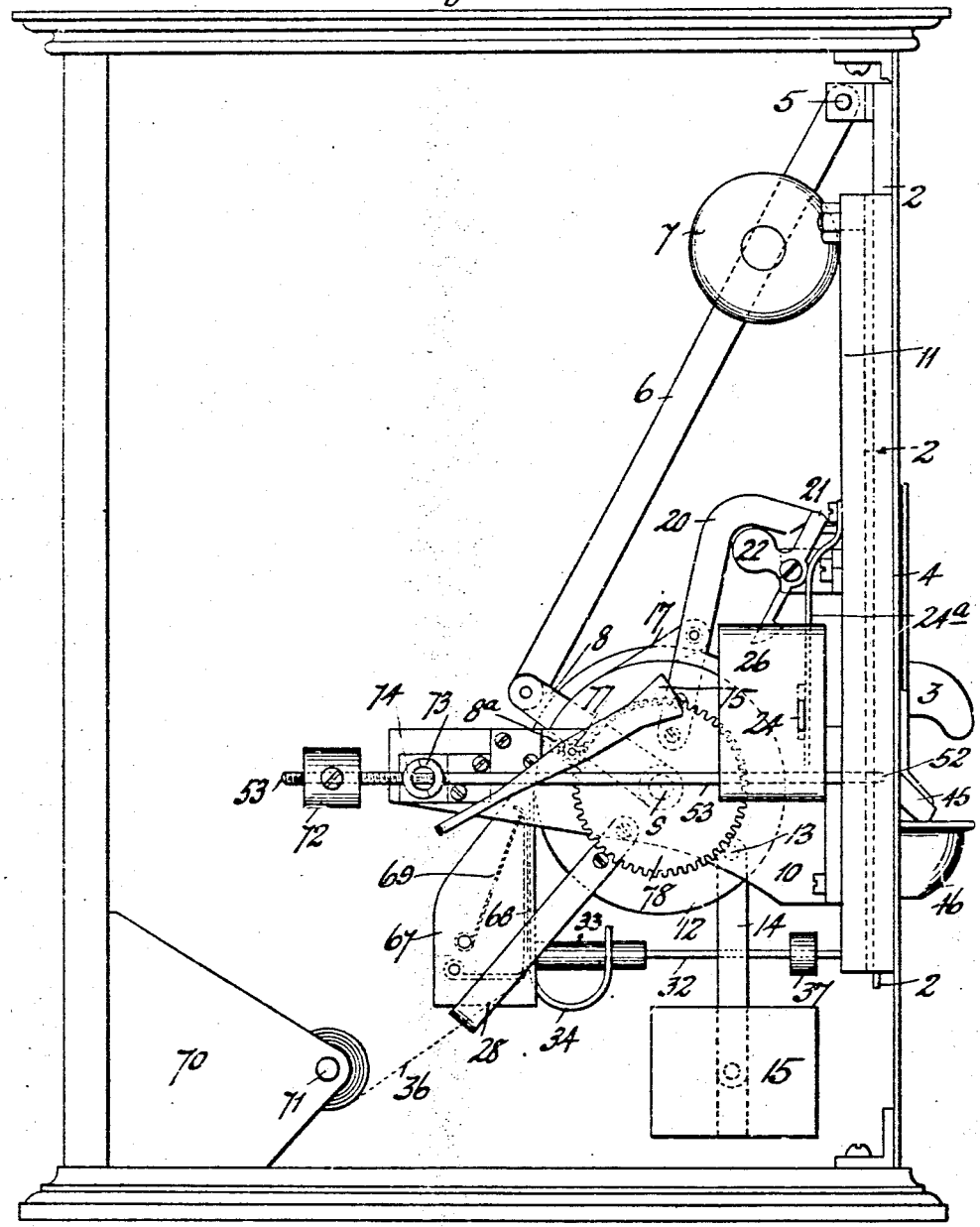
Figure 3:
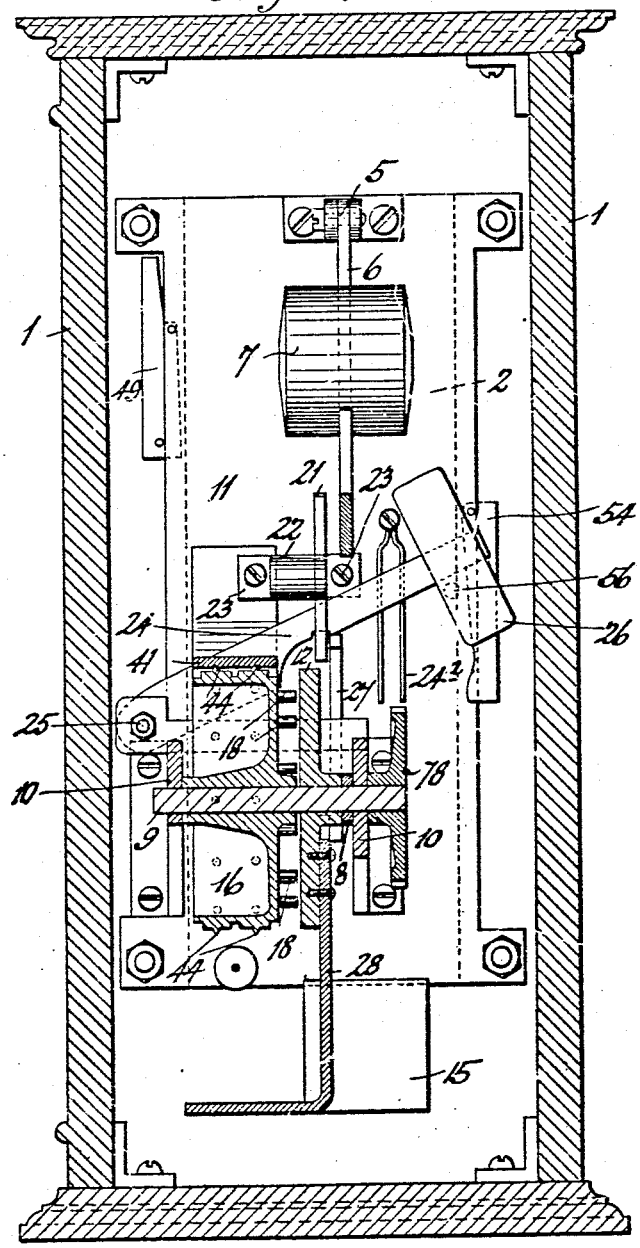

Figure 1 is a side elevation with parts in section. Fig. 2 is also a side elevation from the reverse side to Fig. 1 and with the mechanism in a different position. Fig. 3 is a section on the line 3—3 of Fig. 1 looking in the direction of the arrows. Fig. 4 is an elevation of the operating slide and inclosing plate with the front of the casing removed. Fig. 5 is a similar view to Fig. 4 with the slide in elevated position. Fig. 6 is a rear elevation of the slide showing certain locking and releasing mechanism. Fig. 7 is a detail view of Fig. 6 showing said locking and releasing mechanism in a different position. Fig. 8 is a section on the line 8—8 of Fig. 6 looking in the direction of the arrows. Fig. 9 is a detail view of part of the gravity operated rocker mechanism hereinafter referred to and Fig. 10 is a detail view of the escapement or coin release mechanism.

1 indicates the casing of the machine which may be provided with suitably disposed doors for permitting access to the interior mechanism.

2 represents a slide provided with a knob or handle 3 projecting through the front 4 of the casing for actuation by the purchaser. The slide 2 is pivotally connected at its upper end as at 5 to a setting bar 6 carrying a weight 7, said setting bar being pivotally connected at its opposite end with an arm 8 loosely mounted on a transverse shaft 9 carried in bearing plates or brackets 10 secured to the machine casing or to the slide inclosing casing or plate 11. A wheel 12 hereinafter referred to as a rocker is also loosely mounted on the shaft 9 and to said wheel is pivotally connected at 13 a bar 14 carrying a weight 15. The rocker 12 is re-set each time the machine operates by the downward movement of the bar 6 causing the arm 8 to act on a pin 8ª Fig. 2 projecting laterally from the rocker. The said wheel 12 is adapted at each operation of the machine to rotate for a certain distance towards the front of the casing (in a manner to be hereinafter described) carrying with it the sprocket-wheel 16 rigidly mounted on the shaft 9. The connection between the rocker and sprocket-wheel is effected by means of a hook or catch 17 adapted to engage a series of pins 18 projecting laterally from the sprocket-wheel (see more particularly Fig. 9). The rocker 12 returns to its original position when the machine is re-set whereas the sprocket wheel is prevented from backward movement by a pawl or catch 19 also engaging one of said series of pins 18.

Connected to the rocker 12 is an arm or hammer 20, to which the aforesaid hook 17 is pivotally attached, adapted at each forward movement of said rocker to abut against and release catch 21 carrying a weight 22 and pivoted in brackets 23. This catch normally supports a knife bar 24 (see more particularly Fig. 3) pivoted at 25 and carrying at its opposite end a weight 26. To the rocker is also connected a rod or lever 27 contacting with the lever surface of the knife bar 24 and adapted to raise or re-set said bar when the rocker returns to its original position. In order to hold the knife in contact with the catch 21 a light spring 24ª may be provided and a stop 21ª may also be furnished against which abuts the upper end of the catch 21 when the latter is shifted as shown in Fig. 2. The rocker also carries a guide or brake rod 28 which engages the weight 15 when the mechanism is in its normal position but is removed therefrom on forward movement of the rocker and sprocket-wheel as shown in Figs. 1 and 2 respectively. In cases where it is preferred that the purchaser shall himself detach the stamp or ticket, the knife may be dispensed with and the stamp torn off from the strip at the delivery chute this operation being assisted by providing a toothed or like jaw or jaws past which the strip is fed.

The aforesaid operating slide 2 is provided with an aperture 29 for passage of the coin to the chute or space 30 between said slide and the interior wall of the slide inclosing casing 11. This aperture normally coincides with a similar aperture 31 in the front wall of the casing 1 and for the purpose of indicating to the purchaser when the supply of stamps has become exhausted the exterior surface of the slide is inscribed with the word "Empty" or similar indication, the latter being adapted to arrive opposite said aperture 31 when the slide is raised and to remain in such position should the supply of stamps in the machine be exhausted, in which case the slide is prevented from falling for which purpose a rod or plunger 32 is provided having an enlarged end 33 for instance of vulcanite or like material adapted to have sliding movement in a bracket or bow 34 and to normally bear by means of a weight 37 thereon with its outer end 35 against the strip of stamps 36. The other end of the rod is attached to a catch or dog 38 pivoted at 39 and passing at its upper end 40 through the casing 11 to engage a notch or recess in the slide 2 should the end 33 lose its support owing to the absence of the strip of stamps 36 but otherwise that is to say so long as a stamp is present against which said end 33 may bear, the dog 38 is held out of engagement with the slide and allows same to descend.

If desired the plunger may be in electrical connection with a post office or headquarters so that upon the stamps giving out, a circuit is closed or opened and an alarm or indication given at such office. This may be effected in any manner well known in the art and is considered to need no further description.

For the purpose of keeping the strip of stamps in place on the sprocket-wheel 16 a movable or loose cover or weight 41 is provided. In the form illustrated this cover has a depending arm 42 pivoted at 43 to one of the bearing plates 10 (see Fig. 1) and is provided with grooves 43 engaging the pins 44 of said wheel to permit easy movement of the wheel and passage of the stamps therewith while itself remaining stationary. The cover also tends to facilitate the passage of the stamps to the inclined delivery chute 45 and in cases where a knife is used after the stamp has been cut from the strip it passes down said chute to a cup or bowl 46 on the front wall of the casing. To further assist the stamp into the chute and prevent same riding up the rear face of the slide casing 11 a bent spring plate 47 secured to said casing may also be provided as shown in Fig. 1.

When desired for example where a delivery cup is not used the detached stamp may be prevented from falling from the chute 45 by means of a light pivoted flap 48 having fingers which bear upon said stamp with sufficient weight to lightly hold same until removed by the purchaser.

The preferred form of coin-freed mechanism is as follows: Referring more particularly to Figs. 4 and 5 the coin on insertion into the machine through the apertures 31 and 29 in the outer casing and slide respectively falls into the channel or passage 48ª between the back of the slide and front wall of the slide casing 11 and releases a catch 49 normally holding the slide in locked condition, so that the slide may now be raised. The coin is held between said catch 49 and a point 50 opposite same (see Fig. 4) and at such a distance as to just support a coin of the correct denomination. On the slide being raised (Fig. 5) to approximately its full height a projection 51 thereon engages the coin, removes it from the position described and causes it to fall down a continuation 48ᵇ of the coin passage (as indicated by the arrow a Fig. 5) on to the end 52 of a balance or lever 53 which releases the escapement as hereinafter described. Should however an attempt be made to operate the machine by means of a false coin or disk, or one having a diameter a fraction smaller than that for which the machine is intended, said false coin will not be held between the catch 49 and point 50 but will continue to fall straight down the channel 48ᶜ (as indicated by arrow b Fig. 4) and be returned to the would be purchaser through the stamp delivery chute 45.

When the slide 2 has been released by a correct coin as described above and lifted for a certain distance a pivoted catch 54 may be caused to engage a notch 55 in the slide and prevent the latter from returning until the knife has operated, the weight 26 at the end of the knife bar 24 having a laterally projecting pin 56 which forces back said catch as the knife is descending.

Figs. 6 and 7 show means for locking the slide against backward movement should the purchaser not raise same to the full distance required. For this purpose a rack 57 is provided on a bar 57ª at the side of the slide and pivoted to a lug on the slide is a weighted pawl or catch 58. Two notches 59 and 60 are also formed in bar 57ª into the lower one 60 of which the catch 58 normally engages. On raising the slide the catch trips over the teeth of the rack 57 and on the slide being raised to its full extent it enters the upper notch 59, whereupon its weighted end 58ª assumes a vertical position and allows the slide to fall again. Should however the purchaser not raise the slide sufficiently for the catch 58 to enter the notch 59 the slide tends to drop by gravity but is prevented from doing so by the catch engaging any one of the teeth of the rack 57 thus holding the slide locked against return movement as shown in Fig. 7.

For the purpose of allowing the operating-handle to be automatically released from the slide as soon as the complete movement of the latter has taken place the following means may be used. A slot 60ª is cut in the front 4 of the casing in which the operating handle 3 is adapted to slide. The said handle is provided with a pivoted dog 61 having two noses 62 and 63 one of which (62) engages an aperture or recess 64 in the slide 2. 65 indicates a face plate secured to the handle for covering the slot 60ᵃ. On the handle being raised the dog 61 will carry the slide 2 with it until the nose 63 strikes the end 66 of the slot 60ᵃ whereupon the nose 62 will be removed from the aperture 64 and the handle released.

For conveniently and evenly leading the strip of stamps 36 to the sprocket-wheel 16 a guide box or the like 67 may be provided within which is mounted a pivoted plate 68 adapted to be pressed lightly against the strip of stamps by means of a wire or other spring 69. The front wall of the box 67 is perforated for passage of the member 33 as shown in Fig. 1 so that said member may abut against the stamps.

70 indicates a box or frame in which is mounted a roller 71 carrying the strip of stamps 36.

Of the setting bar 6, knife bar 24 and free-wheel 12, some or all may be operated by means of springs or other equivalents instead of by weights if desired.

Any convenient form of escapement mechanism may be used, but that represented in the drawings comprises the balance or lever 53 before referred to pivoted at 53ᵃ and carrying an adjustable weight 72 and a stop piece 73 having a cut away portion 74 with which engages the hooked end of a rotatable bar 75 mounted on the axle 76 of a pinion 77 in gear with a toothed wheel 78 rigidly mounted on the shaft 9 the arrangement being such that on depression of the end 52 of the lever the bar 75 is released from the stop piece and through gearing 77 and 78 thus releases the free-wheel 12 for operation by the weight 15, the said gearing also giving the bar 75 a complete rotation and bringing its hooked end again in contact with the stop piece 73.

A cash drawer (not shown) may be provided within the casing in a suitable position to collect the coins after they have acted on the balance rod 53.

The general operation of the machine is as follows: The strip of stamps is wound on the spool 71 or may even rest loose in the box 70 or on the base of the casing and is passed up between the front wall of the box 67 and the plate 68 around the upper part of the circumference of the sprocket-wheel 16 and under the cover or weight 41, until the forward edge is about in the plane of the knife. The stamps are perforated in such a manner that they are engaged by the pins 44 of said sprocket-wheel. With the parts in the position shown in Fig. 1 and the stamps arranged as described the machine is ready to be operated.

On insertion of coin into the aperture 31 in the machine casing and also through that 29 in the slide 2 the catch 19 is acted upon by the coin and the slide released. The slide is now raised by means of the handle 3 and held in such raised position by the catch 54. This movement also lifts the setting bar 6 carrying with it the arm 8. On the coin releasing the escapement in the manner before described the pinion 77 wheel 78 and sprocket wheel 16 all rigidly mounted on the shaft 9 are released thus permitting same to be rotated by the weight 15 acting on the rocker through the hook 17 and a pin 18 the rocker having been until now held by said pin and hook connection. Said rocker thus carries with it in its forward movement the sprocket-wheel 16 by means of the co-acting hook 17 and pins 18 thus feeding one stamp's length forward into the chute 45 and bringing the rear end of said stamp immediately below the knife. The aforesaid forward movement of the sprocket-wheel has also caused the arm or hammer 20 to shift the catch 21, (the rod 27 having meanwhile been also withdrawn) so that the knife bar 24 is released and under the action of the weight 26 falls and cuts off the stamp which thereupon drops down the chute 45 by gravity into the delivery cup 46 or is held by the flap 48 as the case may be.

The knife bar during its descent has acted on the catch 54 to release the slide, the latter now falling and with it the weighted setting bar 6 and arm 8 which movement returns the free-wheel to its original position by the arm 8 engaging a pin 8ᵃ on the free-wheel and at the same time raises the weight 15 and knife lifting rod 27 so that all the parts are returned to their original positions, with the exception of the sprocket-wheel which is prevented from rearward movement by the dog 19 as aforesaid and consequently also the wheel 78 and pinion 77 which are in rigid connection with said rocker through the shaft 6. The catch 21 has also been caused to again engage the knife bar 24 by means of its weight 22.

It will be observed since the coin frees the machine for operation when falling on the balance or escapement lever, and thus permits the sprocket-wheel to revolve and also the rocker carrying the hammer which releases the knife, the operation of the slide releasing catch 49 by any means without insertion of a coin will have no effect on the machine and the same will remain locked.

The machine may be adjusted to deliver any desired number of stamps or tickets at each operation although in the above description it is assumed that only one stamp is delivered at a time. It is also contemplated to provide the machine with a registering dial to tally or check the sale of stamps with the amount of cash deposited in the machine so that pilfering by officials or other persons may be detected or prevented and this arrangement may be effected in any convenient or expedient manner.

We do not limit ourselves to the particular construction or arrangement of the parts described since the same may be suitably varied and some of the devices omitted without departing from the spirit of the invention.

What we claim as our invention and desire to secure by Letters Patent of the United States is:—

1. In a vending machine the combination of an intermittingly rotatable feed wheel adapted to support a strip of vendible articles a hand operated lifting slide coin-controlled means for releasing said slide two loaded driving mechanisms interposed between said slide and feed wheel, the first of said mechanisms being adapted to energize the second and the second being adapted to actuate the feed wheel, and coin-actuated means for releasing said loaded driving mechanism.

2. In a vending machine the combination of an intermittingly rotatable feed wheel adapted to support a strip of vendible articles, a hand operated vertically movable slide, coin-controlled means for releasing said slide a loaded rocker, a releasable connection between said feed wheel and rocker, and coin-operated means for controlling the operation of the rocker, two loaded driving mechanisms interposed between said slide and feed wheel the first of said mechanisms being adapted on downward movement of the slide to energize the rocker, and the second being adapted to actuate the feed wheel through the rocker and aforesaid releasable connection.

3. In a vending machine the combination of an intermittingly rotatable feed wheel adapted to support a strip of vendible articles a loaded rocker, a releasable connection between said rocker and feed wheel, a vertically movable hand operated slide, normally locked coin-controlled means for releasing said slide when it is desired to operate the machine, means co-acting with said slide for setting the rocker against the action of its load, coin-controlled means for releasing the rocker and permitting the same to impart motion to the feed wheel and additional means for locking said slide when the supply of vendible articles is practically exhausted.

4. In a vending machine the combination of a casing having an aperture therein, an intermittingly rotatable feed wheel adapted to support a strip of articles to be vended, a loaded rocker, a releasable connection between said rocker and feed wheel a vertically movable hand operated slide connected with the loaded rocker to set the rocker against the action of its load normally locked, coin-controlled means for releasing said slide when it is desired to operate the machine, a coin-controlled escapement mechanism for releasing said rocker and permitting the same to impart motion to the feed wheel to project a portion of the aforesaid strip through the aperture in the casing, and means for preventing retrograde movement of the feed wheel.

5. In a vending machine the combination of a device for intermittingly feeding the articles to be vended in a strip, a vertically movable hand operated actuating slide coin-controlled means for releasing said slide releasable means set by said slide for operating the feed device, coin-actuated means for releasing said releasable means, a handle for said slide and means for releasing said handle from the slide when the latter has reached a certain position.

6. In a vending machine the combination of a device for intermittingly feeding the articles to be vended in a strip, a normally locked hand-operated actuating slide having an aperture therein, coin-controlled means for releasing said slide when it is desired to operate the machine, releasable means set by said slide for operating the feed device, coin-controlled means for releasing said releasable means a handle for said slide, a trip-dog pivoted to said handle and adapted to engage the aperture in the slide, and a stationary abutment adapted to trip said dog and remove same from the slide aperture for the purpose set forth.

7. In a vending machine the combination of an intermittingly rotatable feed wheel and means for supporting a perforated strip of vendible articles on said wheel, a hand operated actuating slide, coin-controlled means for releasing the slide, propelling means adapted to be set by said slide for operating said feed wheel, a loaded member normally engaging said strip, a locking dog actuated by said member and adapted to lock the slide when said member ceases to engage the strip and coin-actuated means for releasing said propelling means, substantially as described.

8. In a vending machine the combination with a casing having an aperture, an intermittingly rotatable feed wheel adapted to support a strip of vendible articles, a hand operated actuating slide movable behind the aperture in the casing, coin-operated means for releasing said slide, actuating means adapted to be set by said slide for operating the feed wheel, coin-controlled means for releasing said actuating means a loaded member normally engaging said strip, a locking dog actuated by said member and adapted to lock the slide when said member ceases to engage the strip, and means on said slide for indicating when the machine is exhausted of articles to be vended, said means remaining visible through the casing aperture when the slide is locked as aforesaid.

9. In a machine for vending postage stamps, tickets or the like the combination of a casing having a coin aperture and a stamp or ticket discharge aperture, a sprocket feed wheel rotatable intermittingly towards said discharge aperture and adapted to support a perforated strip of stamps or tickets, a normally locked hand operated slide coin-controlled means for releasing said slide when it is desired to operate the machine, a loaded rocker adapted to impart such intermittent rotation to the feed wheel, means co-acting with the slide for setting the rocker, escapement mechanism for releasing the rocker and permitting same to be actuated by its load, coin-operated means for controlling the operation of said escapement mechanism, means releasable by said rocker for detaching a portion of said perforated strip, means, releasable by said detaching means for locking the slide in its upper position, means for resetting the detaching means aforesaid, means for preventing retrograde movement of the sprocket wheel, means for locking the operating slide when the stamps or tickets are exhausted, and means for visibly indicating such exhausted condition substantially as described.

In witness whereof we have signed this specification in the presence of two witnesses.

ROBERT JAMES DICKIE.
JOHN HENRY BROWN.

Witnesses:
GEO. WORSFOLD,
MATTHEW HICKEY.